June 27, 1933.  W. C. HEDGCOCK  1,916,153
TRUCK
Filed Oct. 29, 1931  2 Sheets-Sheet 1
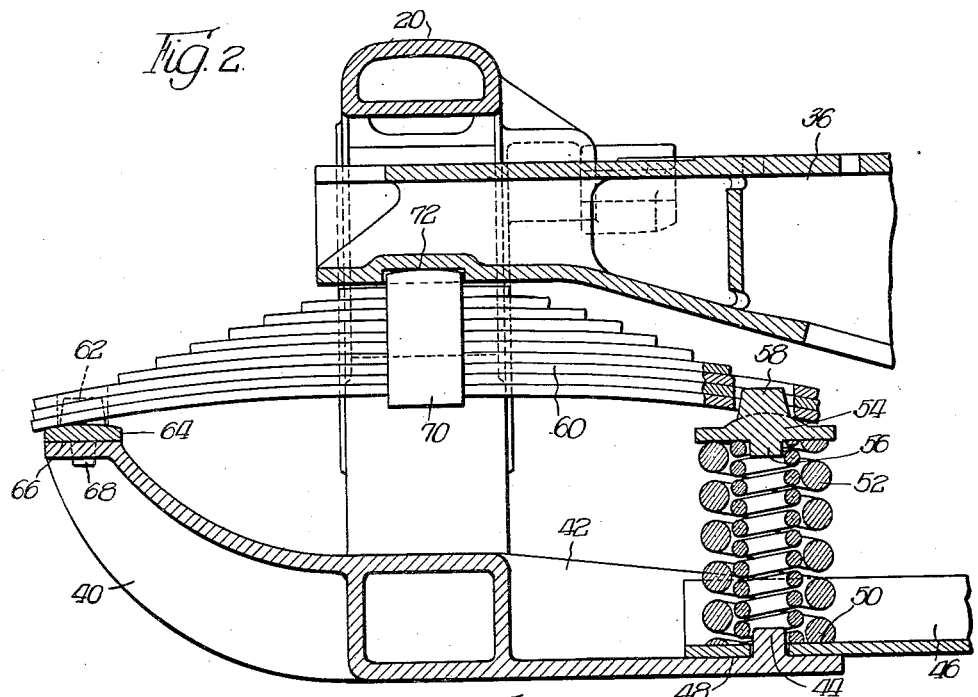
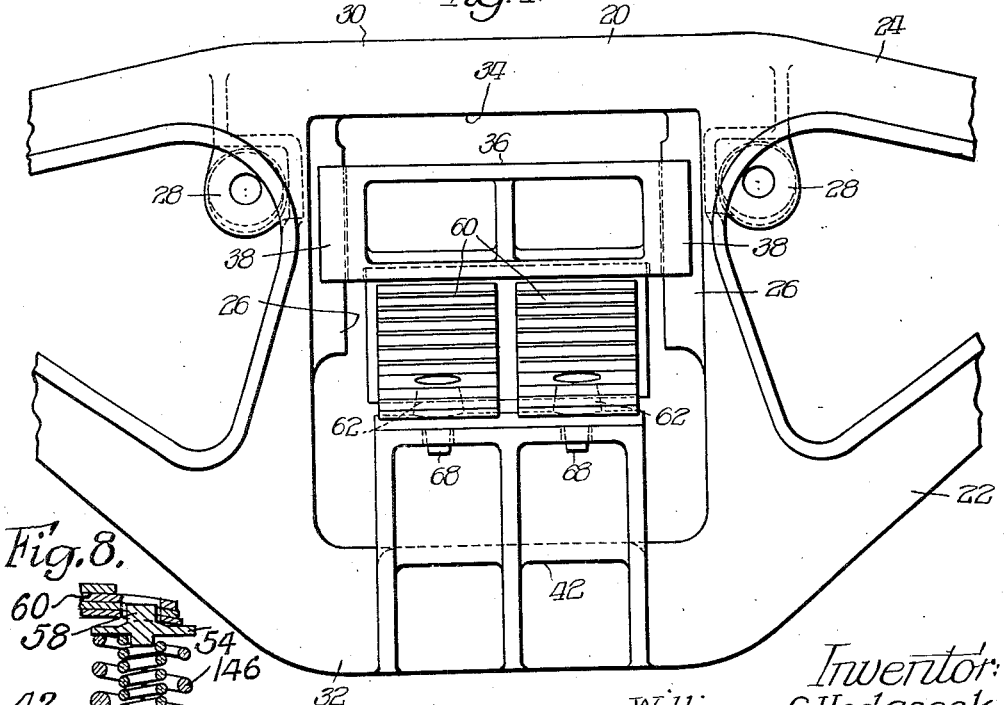
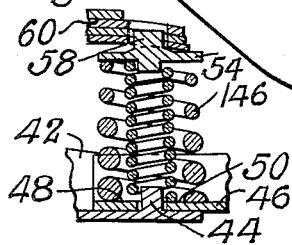
Inventor:
William C. Hedgcock.
By Wilkinson, Huxley, Byron & Knight
attys June 27, 1933. W. C. HEDGCOCK 1,916,153
TRUCK
Filed Oct. 29, 1931 2 Sheets-Sheet 2
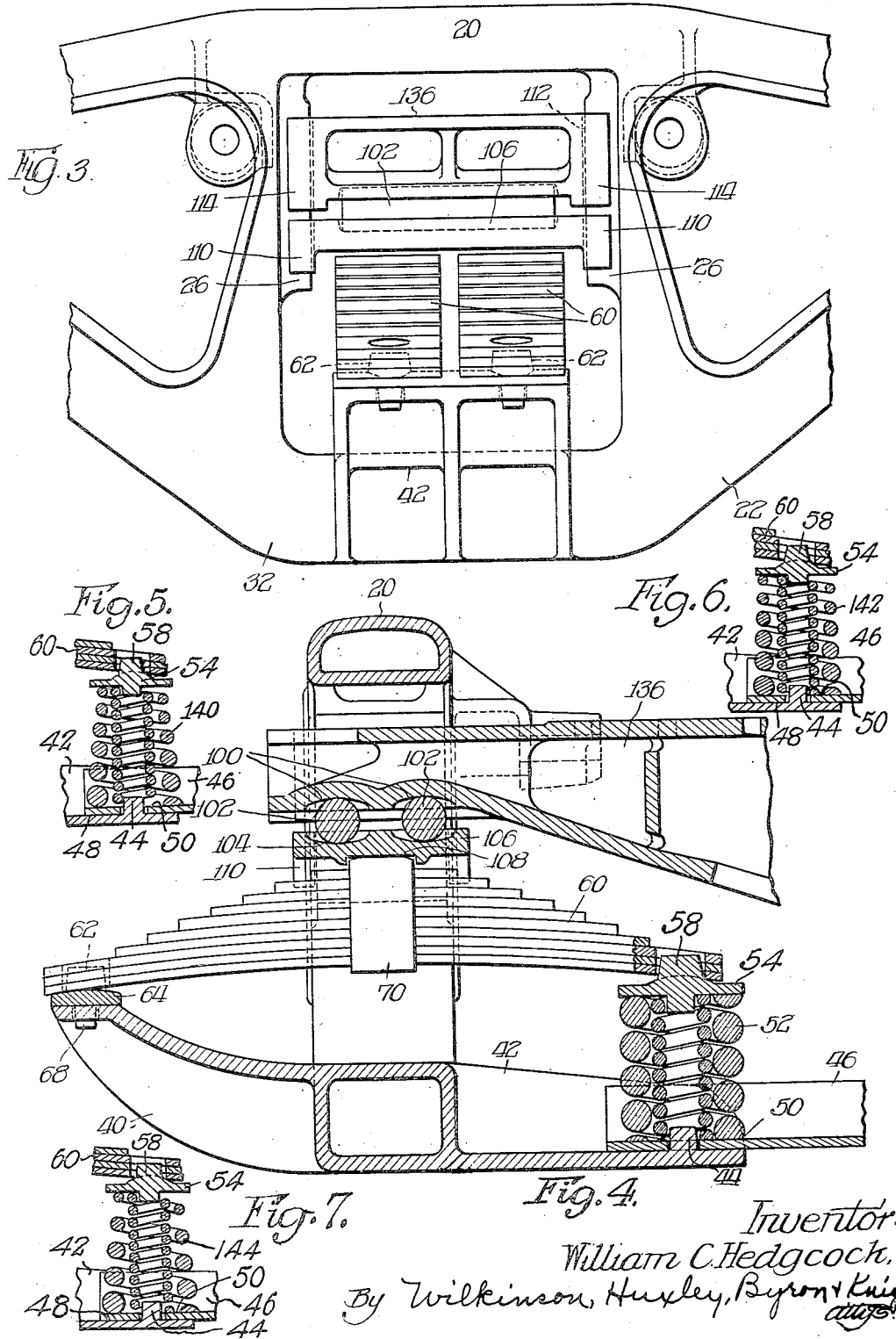

Patented June 27, 1933

1,916,153

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 29, 1931. Serial No. 571,756.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction means are disposed in series.

A different object is to provide spring assemblies wherein there is provided softer cushioning action under light loads, while at the same time providing the necessary stiffness and capacity under heavy loads, these features being combined also to provide a construcion which reduces any tendency toward synchronous vibration of the springs.

A still different object is to provide a truck construction embodying any of the above objects singly or in combination wherein a lateral motion bolster is included.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary side elevation of a truck construction embodying the invention;

Figure 2 is a fragmentary transverse sectional elevation taken substantially in the plane of the transverse center line of the truck construction illustrated in Figure 1;

Figures 3 and 4 are elevations corresponding substantially to Figures 1 and 2 showing modified forms of the invention;

Figures 5 to 8 inclusive are fragmentary sectional elevations through coil and leaf spring connections showing different forms of coil springs, Figure 5 showing a coil spring formed from a tapered bar, the spring being of varying pitch and varying diameter;

Figure 6 shows a tapered coil spring of constant diameter and varying pitch;

Figure 7 shows a tapered coil spring of constant pitch and varying diameter;

Figure 8 shows a tapered coil spring of constant pitch and constant diameter.

In the truck construction illustrated, the side frame 20 is preferably of truss construction including the tension member 22 and compression member 24 integrally connected by means of the column guides 26, the truck being provided with the usual brake hanger brackets 28 and the usual journal boxes (not shown). The column guides together with the upper and lower arch bars 30 and 32 form a window or bolster opening 34, the columns being widened adjacent the lower arch bar for facilitating application of the bolster 36. The bolster, which is preferably of the conventional type, extends into the bolster opening, being provided with the spaced lugs 38 embracing the column guides, and permitting vertical sliding movement of the bolster.

The lower arch bar 32 between the columns is provided with the laterally extending outer wing or bracket 40 extending outwardly and upwardly and is provided with the inner wing or bracket 42. The inner wing is provided with the upwardly extending positioning dowel 44 which is received in a suitable aperture formed in the spring plank 46 which connects the side frames. It of course is understood that the spring plank may be omitted, but where used ties the two side frames and maintains them in square relation. The spring plank, when used, is seated on the coil spring seat 48 and itself provides the seat 50 for the coil spring assembly 52.

The coil spring assembly 52 may be of any desired character such as a spring of variable stiffness, variable pitch, constant pitch, variable sectional diameter, or of any type such as illustrated in application Serial No. 552,153, filed July 21, 1931.

The spring assembly is provided with the spring cap 54 having the depending positioning dowel 56 cooperating with the coil spring assembly, and the upwardly extending positioning dowel 58 received in a suitable aperture formed in the inner end of the leaf spring assembly 60. The outer end of the leaf spring assembly 60 is provided with a suitable aperture for receiving the upwardly extending positioning dowel 62 provided on the spring seat 64 seated on the seat portion 66 of the wing 40, the depending positioning dowel 68 being received in a suitable aperture in the seat portion 66.

The semi-elliptic spring assembly 60 is provided with the spring band 70 disposed substantially in the plane of the side frame and supports the bolster 36 through engagement with the seat 72. The load through the bolster and leaf and coil springs serves to maintain the spring plank, where used, in proper position. With this arrangement the springs act in series and tend to dampen out each other's vibrations, preventing the building up of impulses which might cause damage to lading, or derailment.

Referring now more particularly to the construction illustrated in Figures 3 and 4, the bolster 136 is provided with the lateral motion tracks 100 having cooperative relation with the lateral motion rollers 102 fitting in complementary tracks 104 formed in the track member 106. The track member 106 is provided with the seat 108 corresponding to the seat 72, being supported on the spring band 70 of the semi-elliptic spring assembly 60. The track member 106 is provided with the depending guide members 110 embracing the column guides 26 for permitting vertical movements of the track member, and consequently the bolster. The bolster 136 is provided with surfaces 112 having sliding cooperation with the column guides 26, the lateral motion of the bolster being limited by the lugs 114 disposed outwardly of the column guides 26. It will thus be seen that the bolster is capable of vertical and lateral movements, the lateral movements being permitted but limited by the lugs 114. At the same time, the lateral motion means is so disposed that the bolster tends to return to initial stop position. The operation of this form of construction is, of course, similar to that already described, with the addition of the lateral motion means.

In the constructions shown in Figures 5 to 8 inclusive, a spring of varying stiffness is shown as applied between the seat 50 and the spring cap 54. The spring 140 shown in Figure 5 is a tapered spring, that is, it is formed from a tapered bar of varying patch and varying diameter. The tapered spring 142 shown in Figure 6 is of varying pitch and constant diameter. The tapered spring 144 shown in Figure 7 is of constant pitch and varying diameter, whereas the tapered coil spring 146 illustrated in Figure 8 is of constant pitch and constant diameter.

It will of course be appreciated that rubber or other resilient pads may be used between the springs and/or truck parts, and it is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, and a coil spring interposed between one of said wings and one end of said semi-elliptic spring.

2. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, and a metallic spring interposed between one of said wings and one end of said semi-elliptic spring.

3. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, and a coil spring interposed between one of said wings and said semi-elliptic spring.

4. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, and a metallic spring interposed between one of said wings and said semi-elliptic spring.

5. In a car truck, the combination of a side frame, laterally extending wings rigidly provided on said side frame, a bolster, a leaf spring supporting said bolster on said wings and extending therebetween, and resilient means between a portion of said leaf spring and one of said wings.

6. In a car truck, the combination of a side frame, laterally extending wings provided on said side frame, a bolster, a leaf spring supporting said bolster on said wings, and a coil spring between a portion of said leaf spring and one of said wings.

7. In a side frame, the combination of a tension and compression member, and wing members rigidly provided on one of said members and extending laterally of said side frame, said wing members providing spring seats adjacent the ends thereof, one of said seats being disposed at a different level than the other of said seats.

8. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a metallic spring, and the other connection being non-resilient.

9. In a car truck, the combination of a side frame including tension and compression members and integrally connecting column guides forming a bolster opening, a bolster extending into said opening and slidably cooperating with said column guides, and a leaf spring supporting said bolster at a point and supported on said side frame at a plurality of points, one of said points of support being through a resilient member disposed inwardly of said side frame.

10. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a coil spring, and the other connection being non-resilient.

11. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a coil spring of variable pitch, and the other connection being non-resilient.

12. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a coil spring of variable stiffness, and the other connection being non-resilient.

13. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a coil spring of variable diameter, and the other connection being non-resilient.

14. In a car truck, the combination of a side frame including tension and compression members and integrally connecting column guides forming a bolster opening, brackets provided on said side frame at different levels, a bolster extending into said opening and slidably cooperating with said column guides, and a leaf spring supporting said bolster at a point and connected to said side frame brackets, one connection being through a coil spring of variable sectional diameter, and the other connection being non-resilient.

15. In a car truck, the combination of a side frame including tension and compression members and integrally connecting column guides forming a bolster opening, a bolster extending into said opening and slidably cooperating with said column guides, and a leaf spring supporting said bolster at a point and supported on said side frame at a plurality of points, one of said points of support being through a seat member disposed outwardly of said side frame and the other of said points of support being through a metallic spring.

16. In a car truck, the combination of a side frame including tension and compression members and integrally connecting column guides forming a bolster opening, a bolster extending into said opening and slidably cooperating with said column guides, and a leaf spring supporting said bolster at a point and supported on said side frame at a plurality of points, one of said points of support being through a seat member disposed outwardly of said side frame and another of said points of support being inwardly of said side frame, one of said points of support being through a metallic spring.

17. In a car truck, the combination of a side frame including tension and compression members and integrally connecting column guides forming a bolster opening, a bolster extending into said opening and slidably cooperating with said column guides, and a leaf spring supporting said bolster at a point and supported on said side frame at a plurality of points, one of said points of support being through a seat member disposed inwardly of said side frame, and one of said points of support being through a metallic spring.

18. In a car truck, the combination of a side frame including tension and compression members and integrally connecting column guides forming a bolster opening, a bolster extending into said opening and slidably cooperating with said column guides, and a leaf spring supporting said bolster at a point and supported on said side frame at different levels at a plurality of points, one of said points of support being through a coil spring disposed inwardly of said side frame.

19. In a car truck, the combination of spaced side frames having inwardly extending brackets, and a spring plank supported on said brackets inwardly of said side frames, coil springs disposed inwardly of said side frames and supported by said spring plank, leaf springs supported by said side frames and by said coil springs, and a bolster supported by said leaf springs.

20. In a car truck, the combination of spaced side frames having inwardly extending brackets, a spring plank supported on said brackets inwardly of said side frames, coil springs disposed inwardly of said side frames and supported by said spring plank, leaf springs supported by said side frames outwardly thereof and by said coil springs, and a bolster supported by said leaf springs.

21. In a car truck, the combination of spaced side frames having inwardly extending brackets, a spring plank supported on said brackets inwardly of said side frames, coil springs disposed inwardly of said side frames and supported by said spring plank, spaced leaf springs supported partly by said coil springs and partly directly by said side frames, and a bolster supported by said leaf springs.

22. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, a coil spring interposed between one of said wings and one end of said semi-elliptic spring, and lateral motion means interposed between said semi-elliptic spring and said bolster.

23. In a car truck, the combination of a side frame including tension and compression members and integrally connecting column guides forming a bolster opening, a bolster extending into said opening and slidably cooperating with said column guides, laterally extending wings rigid with said side frame and disposed adjacent said bolster opening, a semi-elliptic spring supporting said bolster and supported on said wings, a coil spring interposed between one of said wings and said semi-elliptic spring, and lateral motion means interposed between said semi-elliptic spring and said bolster.

24. In a car truck, the combination of a side frame, laterally extending wings rigid with said side frame and disposed at different levels, a bolster, a semi-elliptic leaf spring supporting said bolster on said wings, lateral motion means interposed between said leaf spring and said bolster, and resilient means between a portion of said leaf spring and one of said wings, another portion of said leaf spring being non-resiliently mounted on another of said wings.

25. In a car truck, the combination of a side frame including tension and compression members and integrally connecting column guides forming a bolster opening, a bolster extending into said opening and slidably cooperating with said column guides, a leaf spring supporting said bolster at a point and supported on said side frame at different levels at a plurality of points, one of said points of support being through a coil spring disposed inwardly of said side frame, and lateral motion means interposed between said leaf spring and said bolster.

26. In a car truck, the combination of a side frame including tension and compression members and integrally connecting column guides forming a bolster opening, a bolster extending into said opening and slidably cooperating with said column guides, a leaf spring supporting said bolster at a point and supported on said side frame at a plurality of points, one of said points of support being through a seat member disposed outwardly of said side frame and another of said points of support being inwardly of said side frame, one of said points of support being through a metallic spring and lateral motion means interposed between said leaf spring and said bolster.

27. In a car truck, the combination of a side frame including tension and compression members and integrally connecting column guides forming a bolster opening, a bolster extending into said opening and slidably cooperating with said column guides, a leaf spring supporting said bolster at a point and supported on said side frame at different levels at a plurality of points, one of said points of support being through a coil spring disposed inwardly of said side frame, and lateral motion means interposed between said leaf spring and said bolster.

28. In a car truck, the combination of a side frame including tension and compression members and integrally connecting column guides forming a bolster opening, a bolster extending into said opening, lateral motion means including a track member slidably cooperating with said column guides and a roller member interposed between said track member and bolster whereby said bolster is mounted for lateral movements, means on said bolster for limiting said lateral movements, laterally extending wings rigid with said side frame and disposed adjacent said bolster opening, a semi-elliptic spring supporting said track member and supported on said wings, and a metallic spring interposed between one of said wings and one end of said semi-elliptic spring.

29. In a car truck, the combination of a side frame including tension and compression members and integrally connecting column guides forming a bolster opening, a bolster extending into said opening, lateral motion means including a track member slidably cooperating with said column guides and a roller member interposed between said track member and bolster whereby said bolster is mounted for lateral movements, means on said bolster for limiting said lateral movements, laterally extending wings rigid with said side frame and disposed adjacent said bolster opening, a semi-elliptic spring supporting said track member and supported on said wings, and a coil spring interposed between one of said wings and said semi-elliptic spring.

30. In a car truck, the combination of a side frame including tension and compression members and integrally connecting column guides forming a bolster opening, brackets provided on said side frame on different levels, a bolster extending into said opening, lateral motion means including a track member slidably cooperating with said column guides and a roller member interposed between said track member and bolster whereby said bolster is mounted for lateral movements, means on said bolster for limiting said lateral movements, and a leaf spring connected to said track member at a point and connected to said side frame brackets, one connection being through a coil spring and the other connection being non-resilient and the other of said points of support being non-resilient.

31. In a car truck, the combination of a side frame including tension and compression members and integrally connecting column guides forming a bolster opening, a bolster extending into said opening, lateral motion means including a track member slidably cooperating with said column guides and a roller member interposed between said track member and bolster whereby said bolster is mounted for lateral movements, means on said bolster for limiting said lateral movements, and a leaf spring supporting said track member and supported on said side frame at a plurality of points, one of said points of support being through a seat member disposed outwardly of said side frame and another of said points of support being inwardly of said side frame, one of said points of support being through a metallic spring.

32. In a car truck, the combination of a side frame including tension and compression members and integrally connecting column guides forming a bolster opening, a bolster extending into said opening, lateral motion means including a track member slidably cooperating with said column guides and a roller member interposed between said track member and bolster whereby said bolster is mounted for lateral movements, means on said bolster for limiting said lateral movements, and a leaf spring supporting said track member at a point and supported on said side frame at different levels at a plurality of points, one of said points of support being through a coil spring disposed inwardly of said side frame.

33. In a truck, the combination of a side frame, a load carrying member, and a leaf spring resiliently supporting said load carrying member on said side frame, said side frame having inner and outer brackets, said spring being non-resiliently supported on one of said brackets and resiliently supported on the other.

34. In a truck, the combination of a side frame, a load carrying member, and a leaf spring resiliently supporting said load carrying member on said side frame, said side frame having inner and outer brackets, said spring being non-resiliently supported on the outer one of said brackets and resiliently supported on the other.

35. In a truck, the combination of a side frame, a load carrying member, and a leaf spring resiliently supporting said load carrying member on said side frame, said side frame having inner and outer brackets said spring being non-resiliently supported on one of said brackets and resiliently supported on the other through a coil spring.

36. In a truck, the combination of a side frame, a load carrying member, and a leaf spring resiliently supporting said load carrying member on said side frame, said side frame having inner and outer brackets, said spring being non-resiliently supported on the outer one of said brackets and resiliently supported on the other through a coil spring.

37. In a car truck, the combination of a side frame including tension and compression members and spaced integrally connecting columns forming a window therewith, a load carrying member extending into said window and slidably cooperating with said columns, said load carrying member having a lateral motion roller track thereon, laterally extending wings rigid with said side frame and disposed adjacent said window, a semi-elliptic leaf spring supported on said wings, a coil spring interposed between one of said wings and one end of said leaf spring, a roller track supported on said leaf spring and slidably guided by said columns and a roller interposed between said track and said track on said load carrying member whereby said load carrying member is mounted for lateral movement of said car truck.

38. In a car truck, the combination of a side frame including tension and compression members and spaced integrally connecting columns forming a window therewith, a load carrying member extending into said window and having a lateral motion track thereon, laterally extending wings rigid with said side frame and disposed adjacent said window, a semi-elliptic leaf spring supported on said wings, a coil spring interposed between one of said wings and one end of said leaf spring, a roller track supported on said leaf spring and slidably guided by said columns, and a roller interposed between said track and said track provided on said load carrying member whereby said load carrying member is mounted for lateral movement.

Signed at Chicago, Illinois, this 22d day of October, 1931.

WILLIAM C. HEDGCOCK.